United States Patent [19]

Sakaoka et al.

[11] 4,356,798
[45] Nov. 2, 1982

[54] INTAKE SYSTEM FOR USE IN INTERNAL COMBUSTION ENGINE

[75] Inventors: Hiromu Sakaoka, Asaka; Teruyuki Nakano, Tokyo; Shingo Ikeda, Asaka, all of Japan

[73] Assignee: Honda Giken Kogyo Kabushiki Kaisha, Tokyo, Japan

[21] Appl. No.: 264,165

[22] Filed: May 15, 1981

[30] Foreign Application Priority Data

May 17, 1980 [JP] Japan .................................. 55/64682

[51] Int. Cl.³ ........................ F02B 75/18; F02B 75/02
[52] U.S. Cl. ............................. 123/52 MF; 123/52 M; 123/65 E; 123/65 WV; 123/73 V
[58] Field of Search ............ 123/52 M, 52 R, 52 MF, 123/65 E, 65 WV, 73 V, 73 A

[56] References Cited

U.S. PATENT DOCUMENTS

| | | | |
|---|---|---|---|
| 1,802,848 | 4/1931 | Summers | 123/65 E |
| 1,804,321 | 5/1931 | Crowe | 123/65 E |
| 2,337,982 | 12/1943 | Ericson | 123/52 MF |
| 2,770,224 | 11/1956 | Ericson | 123/52 MF |
| 2,952,252 | 9/1960 | Geatty | 123/73 A |
| 3,810,454 | 5/1974 | Hunt | 123/52 MF |

FOREIGN PATENT DOCUMENTS

| | | | |
|---|---|---|---|
| 2378183 | 9/1978 | France | 123/65 E |
| 421011 | 5/1947 | Italy | 123/52 MF |
| 379776 | 7/1973 | U.S.S.R. | 123/65 WV |

Primary Examiner—Wendell E. Burns
Attorney, Agent, or Firm—Sughrue, Mion, Zinn, Macpeak & Seas

[57] ABSTRACT

An internal system for use in an internal combustion engine which includes a carburetor, a throttle valve and a check valve. A supplemental chamber is connected to an intake passage adapted to introduce therethrough air-fuel mixture from the throttle valve to a combustion chamber. The supplemental chamber is in communication with the intake passage at a position between the throttle valve and the check valve. The supplemental chamber is provided with an opening directed tangentially with respect to an inner cylindrical periphery of the intake passage. In another embodiment of the invention, a control passage is formed in communication between the supplemental chamber and the intake passage. A downstream end of the control passage is opened at a position adjacent to an initially opening position of the check valve.

7 Claims, 12 Drawing Figures

FIG. 1
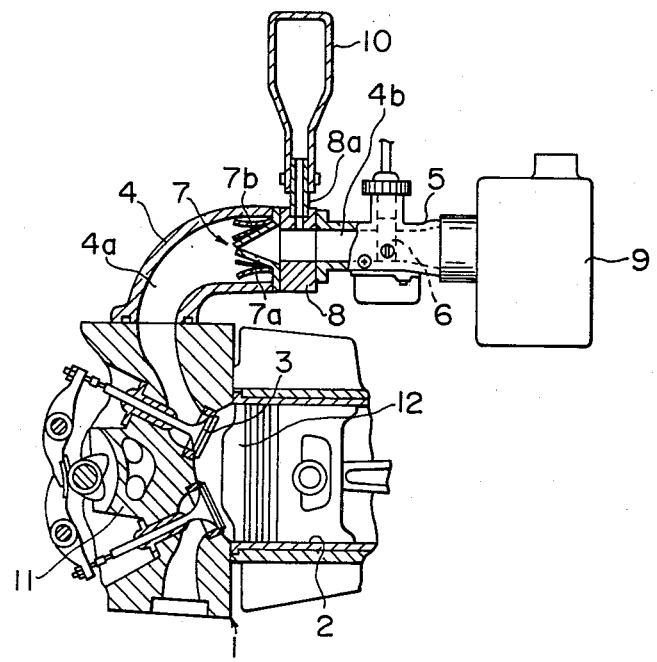
FIG. 2(a)    FIG. 2(b)    FIG. 2(c)
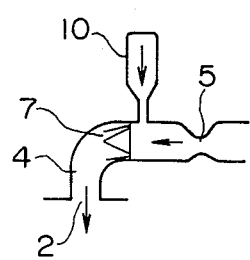 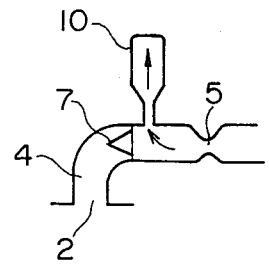 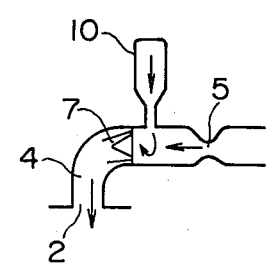

INTAKE SYSTEM FOR USE IN INTERNAL COMBUSTION ENGINE

BACKGROUND OF THE INVENTION

The present invention relates to an improvement in an intake system for use in an internal combustion engine such as four cycle engine or two cycle engine in the principal respect for small vehicle such as automotive bicycle or the like.

In general, the opening degree of the valve required for the intake stroke is set so as to be rather large, thereby bringing about the intake inertia effect, enhancing the charging efficiency and increasing the output in the internal combustion engine.

On the other hand, if the opening degree of the valve required for the intake stroke is relatively large in the low rotation range where there is little intake inertia effect, there may occur the backflow of the air-fuel mixture, thereby lowering the charging efficiency.

In order to prevent this backflow of the air-fuel mixture, there has been known an internal combustion engine with a one-way valve. The one-way valve such as reed valve is provided in an intake passage bridging between a carburetor and a combustion chamber. The present applicant has already proposed an engine of this type (Japanese Patent Publication No. 50884/1972) which is provided with a throttle valve in an intake passage which is in communication with the cylinder of the engine by way of an intake valve as well as a check valve which is positioned at the downstream side thereof so as to permit the inflow of the air-fuel mixture into the combustion chamber but prevent the backflow of the air-fuel mixture, thereby enhancing the output characteristic of the engine especially at the low speed range. However, the intake system of this kind has a drawback in that it takes several time during the intake stroke for the negative pressure in the combustion chamber to be transmitted to the throttle valve in the carburetor by way of the intake passage, thereby disabling the instantaneous feeding of the air-fuel mixture.

In addition, inasmuch as the natural vibration frequency of the reed valve is set higher than the frequency to open and close the valve per hour along with the rotation of the engine so as to cope with the increase in the intake quantity of the air-fuel mixture at the high rotation range in the conventional internal combustion engine with a one-way valve of this kind, there occurred such occasion that the rigidity of the reed valve becomes high so that the opening degree of the reed valve becomes insufficient at the low rotation range.

In order to give a solution to such problem, for example, the peripheral portion of the reed valve was partially made thin so as to improve the efficiency to introduce the air-fuel mixture at the low rotation range. However, it was difficult to provide uniform efficiency to introduce the air-fuel mixture over the whole range from the low rotation range to the high rotation range so as to obtain such an engine capable of providing excellent average charging efficiency and high output.

SUMMARY OF THE INVENTION

It is therefore an object of this invention to overcome the above-mentioned drawbacks and to provide an improved intake system for use in an internal combustion engine.

It is another object of the invention to provide an intake system for use in an internal combustion engine which makes it possible to instantaneously feed the air-fuel mixture into the combustion chamber simultaneously with the start of the intake stroke.

It is still another object of the present invention to provide an intake system for use in an internal combustion engine, which is not affected with the rotation frequency of the engine and which is capable of feeding a sufficient quantity of air-fuel mixture into the combustion chamber so as to enhance the charging efficiency of the engine, and to increase the output yet lowering the fuel consumption.

The above-mentioned objects of the present invention can be achieved by providing a supplemental chamber which is in communication with an intake passage at a position between a throttle valve and a check valve in an internal combustion engine. The engine is of a type having a throttle valve and a check valve positioned at the downstream side of the throttle valve so as to permit the inflow of the air-fuel mixture but prevent the backflow of the air-fuel mixture in an intake pipe which is in communication with the interior of the cylinder of the engine by way of an intake valve. The supplemental chamber serves to accumulate therein air-fuel mixture even after the closure of the check valve upon termination of the intake stroke. For this, at the beginning of the next intake stroke, air-fuel mixture in the supplemental chamber is discharged into the combustion chamber prior to the air-fuel mixture supply from the throttle valve into the combustion chamber.

In the embodiment, the chamber is connected to a control passage whose downstream end is opened at the initially opening portion of the check valve. For example, in case of the employment of a reed valve as the check valve, the downstream end opening is positioned adjacent to a free end of the reed of the reed valve. With this structure, even under the low rotation range of the engine, which provides relatively small negative pressure in the intake passage, the check valve can be opened by the fluid pressure of the air-fuel mixture coming from the supplemental chamber, since the pressure easily urges the free end of the reed against its resiliency. The air-fuel mixture introduced from the supplemental chamber may be obliquely or tangentially introduced into the intake passage, to thereby provide vortex flow or swarling motion of the mixture, and atomize the fuel inadvertantly adhered to the inner peripheral surface of the intake pipe.

The features which are believed to be novel characteristic of this invention are set forth in particular in the appended claims. The invention itself, however, both as to its organization and mode of operation, together with the additional objects and advantages thereof, will become apparent in the course of the following description which is to be read in connection with the accompanying drawings in which like reference characters refer to like parts throughout.

BRIEF DESCRIPTION OF THE DRAWINGS

In the drawings:

FIG. 1 is a cross-sectional view showing an intake system of an internal combustion engine according to a first embodiment of this invention;

FIG. 2(a) through FIG. 2(c) are explanatory illustrations showing operational sequence of the present invention;

DESCRIPTION OF THE PREFERRED EMBODIMENTS

Figure 3:
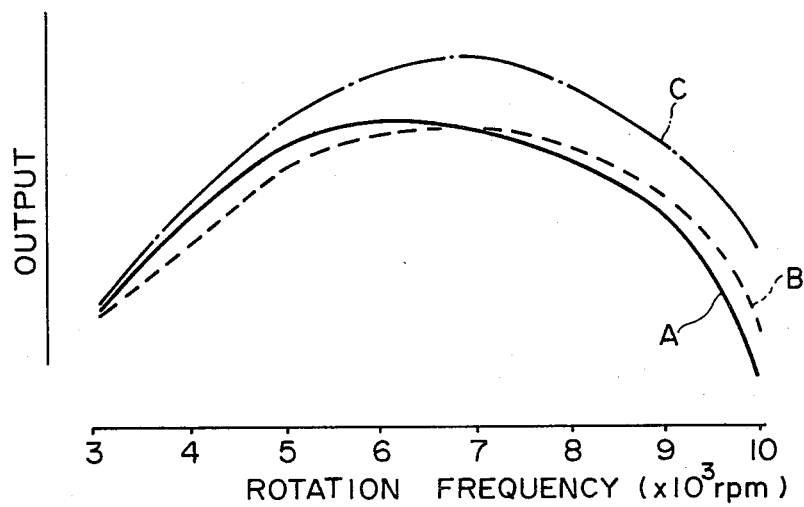
FIG. 3 and FIG. 4 are graphical representations showing the relationship between engine output and rotation speed thereof.

In the first embodiment which is shown in FIG. 1, reference numeral 1 denotes an engine and reference numeral 2 denotes a cylinder of the engine 1. An intake pipe 4 in communication with the interior of the cylinder 2 via an intake valve 3 are provided with a throttle valve 6 of a carburetor 5 and a check valve 7 positioned at the downstream side thereof so as to permit the inflow of the air-fuel mixture but prevent the backflow of the air-fuel mixture to be introduced. The check valve 7 consists of, for example, a reed valve. That is, the check valve 7 is of a type wherein a reed 7b is provided on a valve body 7a and a spacer 8 is provided at the back side thereof. Reference numeral 9 denotes an air cleaner positioned at the upper end of the intake pipe 4. Reference numeral 11 denotes a cylinder head and reference numeral 12 denotes a combustion chamber. As far as the constitution as explained hereinabove is concerned, this embodiment does not differ, in particular, from that of the conventional intake system. The check valve 7 functions in such a way as to improve the output characteristic, in particular, at the low speed range. In accordance with the present invention, a chamber 10 which is in communication with the intake pipe 4 is provided at a position between the throttle valve 6 and the check valve 7. A pipe 8a which extends externally is provided on the spacer 8. The spacer 8 is of annular shape whose inner peripheral surface is flush with that of the intake pipe positioned upstream side thereof in order to permit smooth air-fuel flow ejected through the throttle valve 6. The chamber 10 which is prepared beforehand is fitted to this pipe 8a so as to provide fluid communication with the pipe 4. The chamber 10 may be formed of, for example, iron or other metal or any elastic material such as rubber or the like. The internal volume of the chamber 10 is about 200 cc, for example, in case the engine 1 is of a single cylinder of 50 cc.

The operation of this embodiment is, for example, as shown in FIG. 2(a) through FIG. 2(c). The chamber 8 has a breathing function. In the intake stroke of the engine 1, the check valve 7 is opened as shown in FIG. 2(a) and the air-fuel mixture is introduced into the cylinder 2 by way of this check valve 7, whereupon an intake negative pressure is provided at the upstream side thereof and a negative pressure is also produced in the chamber 10. Then, in case the valve 7 is closed nearly at the completion of the intake stroke, more or less intake negative pressure remains in the chamber 10. This negative pressure inhales the air-fuel mixture from the carburetor 5 as shown by arrows in FIG. 2(b), and the chamber 10 is filled with the air-fuel mixture. In the next intake stroke, the air-fuel mixture in this chamber 10 is introduced into the interior of the cylinder 2 together with the air-fuel mixture from the carburetor 5 as shown in FIG. 2(c). Thus, especially because of the feeding from this chamber 10, the intake efficiency of the engine 1 is enhanced and the output characteristic is improved. In addition, the air-fuel mixture from this chamber 10 produces a vortex flow, which agitates the air-fuel mixture positioned in the intake passage 4a so as to improve the atomization. Furthermore, this chamber 10 functions in such a way as to decrease the pumping output required for the intake of the engine 1 and thus the fuel consumption ratio is effectively lowered. That is, the chamber 10 inhales the air-fuel mixture in advance utilizing the remaining more or less intake negative pressure as mentioned above, and then this air-fuel mixture is introduced into the interior of the cylinder 3 together with the air-fuel mixture from the carburetor 5 in the intake stroke. Thus, the chamber 10 functions in such a way as to decrease the pumping horse power required for the intake of the engine 1 in the intake stroke.

In the below, the explanation will be made in more detail. In the driving condition at the high or middle rotation speed range of the engine, the check valve 7 is opened because of the negative pressure produced in the intake stroke in the intake passage of the cylinder head 11. The air-fuel mixture which is produced in the carburetor 5 flows into the intake pipe 4 of the cylinder head 11 by way of the check valve 7 and then flows into the combustion chamber 2. Even after the completion of the intake stroke, the air-fuel mixture is fed into the main intake passage 4a positioned at downstream side of the check valve 7 and the intake passage in the cylinder head 11 due to the intake inertia of the air-fuel mixture. When the pressures in the main intake passages 4a and 4b respectively upstream and downstream the check valve 7 as produced by the intake inertia of the air-fuel mixture are balanced, the check valve 7 is closed. Then, the pressure of the air-fuel mixture in the main intake passage 4a at the downstream side as well as the intake passage in the cylinder head 11 becomes relatively high. For example, the air-fuel mixture at that time is in such a condition as to be applied a pressure higher than the atmospheric pressure. Thus, the air-fuel mixture is smoothly supplied into the combustion chamber at the start of the next intake stroke, thereby enhancing the charging efficiency.

On the other hand, the backflow of the air-fuel mixture is prevented from occurring at the low speed rotation range, since the main intake pipe 4 is shut off by the check valve 7 during the period other than the time in the intake stroke and immediately thereafter.

In addition, when the check valve 7 is opened, the negative pressure in the main intake pipe 4 is reached to the chamber 10 by way of the pipe 8a. At the initial stage of the closing of the check valve 7, the air-fuel mixture flows into the chamber 10 by way of the pipe 8a so as to increase the pressure in the chamber 10, due to the inertia of the air-fuel mixture which passes through the intake passage 4b at the upstream side and due to the negative pressure in the chamber 10.

Therefore, when the check valve 7 is opened in the next intake stroke, the pressure difference between the main intake passages 4a and 4b respectively at the downstream and upstream side increases in comparison with the case without the chamber 10, thereby effecting the instantaneous opening and closing operation of the check valve 7 and making active the breathing function.

Furthermore, if the breathing function of the check valve 7 is made active, the effect to temporarily store the air-fuel mixture in the chamber 10 is improved. Owing to the effect of the activation of the breathing function in connection with the opening and closing operation of the check valve 7 multiplied by the effect to temporarily store the air-fuel mixture in the chamber 10, the quantity of the air-fuel mixture to be supplied into the combustion chamber 12 from the main intake pipe 4 and from the intake passage in the cylinder head 11 increases, thereby enhancing the charging efficiency and lowering the fuel consumption ratio.

Figure 4:
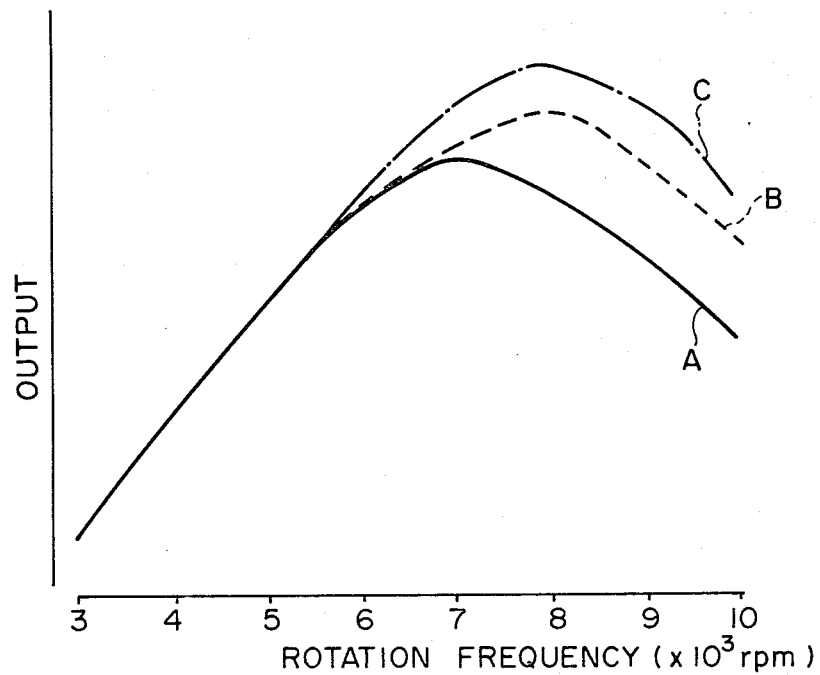
Figure 5:
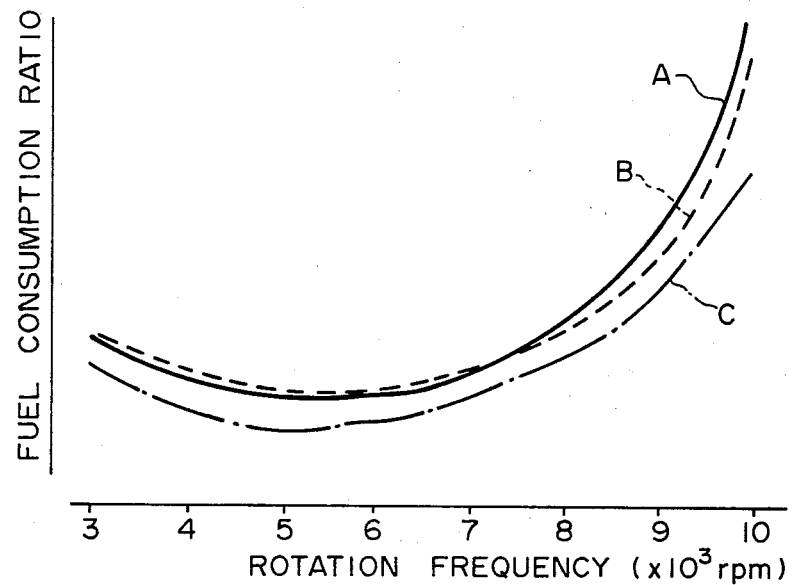
FIG. 5 is a graphical representation showing the relationship between the fuel-consumption ratio and rotation speed of an engine.

In accordance with the result of the experiment conducted by the present inventor, it was confirmed that the present invention shows an excellent output characteristic, for example, as shown in FIG. 3 and FIG. 4 and that the present invention is advantageous as far as the fuel consumption ratio is concerned as shown in FIG. 5. That is, FIG. 3 and FIG. 4 show the output characteristic curves in case the throttle valve 6 is half-opened and fully opened respectively. In these drawings, reference character A denotes the output characteristic of an ordinary engine of a conventional type, reference character B denotes the output characteristic of an engine with a check valve as previously proposed and reference character C denotes the output characteristic of the engine in accordance with the present invention. In FIG. 5 which shows the characteristic curve of the fuel consumption ratio, reference character A denotes the case of an engine of a conventional type, reference character B denotes the case of an engine with a check valve and reference character C denotes the case in accordance with the present invention respectively.

Thus, a check valve is provided in the intake pipe and a chamber is provided at the upstream side of the check valve so that the chamber may effect the breathing function in accordance with the present invention, thereby bringing about such effects as to enhance the intake efficiency and improve the output characteristic and furthermore, decrease the intake horse power and lower the fuel consumption.

Figure 6:
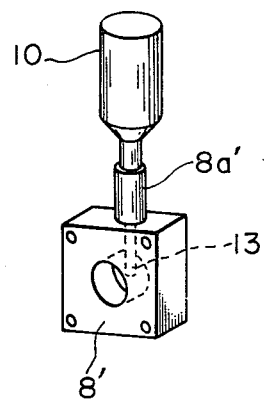
FIG. 6 is a perspective view showing an essential portion of this invention with modification effected to a first embodiment.

As one modification to improve all the more the feeding of the air-fuel mixture into the combustion chamber in the intake system in accordance with the present invention, the constitution as shown in FIG. 6 is proposed. That is, the valve seat of the check valve 7 in FIG. 1 which is provided in the intake pipe 4 of the air-fuel mixture stands as an obstacle against the flow of air fuel mixture and thus the fuel is apt to gather at this portion. In the embodiment which is shown in FIG. 6, the check valve 7 is a reed valve which consists of a valve body 7a and a reed 7b which is mounted to the valve body 7a. A spacer 8' is provided at the upstream side of the check valve. A communication hole 13 is formed in the spacer 8 and is extended vertically between a pipe 8a' and the intake pipe 4. The lower end of the hole 13 is opened substantially tangentially with respect to the intake pipe 4. A chamber 10 which is prepared in advance is fitted to a pipe 8a' which upstandingly extends from the spacer 8' so as to provide fluid communication therebetween. Therefore, when the air-fuel mixture is discharged from the chamber 10, the air-fuel mixture is jetted substantially in the tangential direction towards the intake pipe 4 by way of the communication hole 13. Thus, in case the fuel gathers in advance at the bottom of the pipe 4 at the upstream position of the check valve 7, the jet flow renders the fuel to be atomized, thereby lowering the fuel consumption and improving the startability of the engine.

Figure 7:
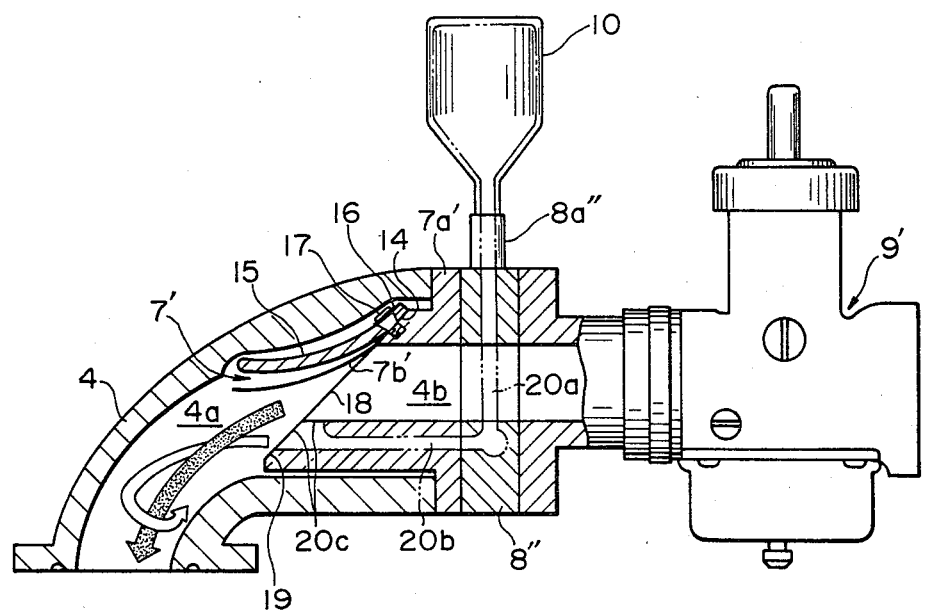
FIG. 7 is a cross-sectional view showing an intake system according to a second embodiment of this invention.
Figure 8:
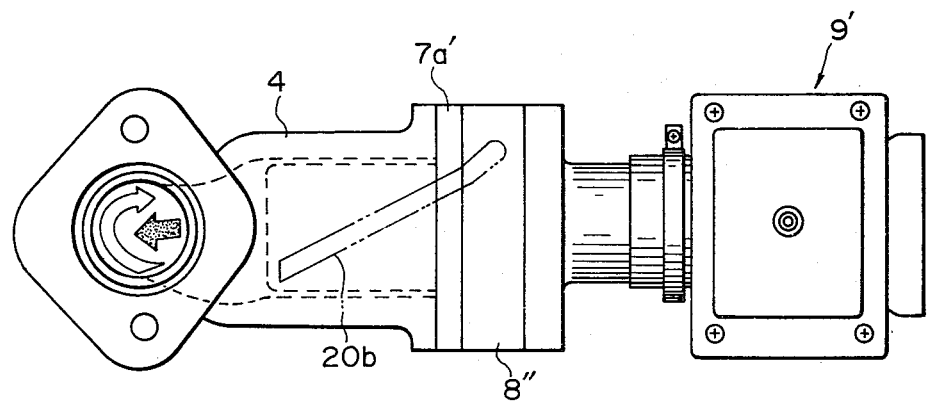
FIG. 8 is a plan view of FIG. 7.

Now, the second embodiment of the intake system in accordance with the present invention will be explained with reference to FIGS. 7 and 8. The exhausting side of a carburetor 9' is air-tightly connected to a valve body 7a' of a reed valve 7' as a one-way valve through a spacer 8" made of an adiabatic material such as resin, asbestos or the like. The valve body 7a' is air-tightly connected to the intake manifold of a cylinder head 11 via an intake pipe 4.

In the reed valve 7', a reed 7b' and a stopper 15 are overlapped in this order on the valve seat base 14 of the valve body 7a'. The intake pipe positioned at the upstream side of the reed valve 7' has its downstream end portion which functions as the valve body 7a'. The upstream side of the intake pipe is divided into two segments so as to fluid-tightly interpose the spacer 8" therebetween. End portions of the reed 7b' and the stopper 15 are integrally fixed by a screw 17 with a washer 16. In the condition without any pressure difference between the main intake passage 4b at the side of the valve body 7a' and the main intake passage 4a at the side of the intake pipe 4, the reed 7b' becomes in close contact with the valve seat 18 of the valve body 7a' because of the resiliency of the reed 7b', so that the main intake pipe 4 is shut off.

In addition, there is provided an inlet chamber 10 as a supplemental chamber of a predetermined capacity above the spacer 8". Further a control passage 20 is formed to provide fluid communication between the inlet chamber 10 and the intake passage 4a positioned at downstream side of the reed valve 7'. The control passage 20 is formed within the spacer 8" from the inlet chamber 10 and extends through the valve body 7a' to open at a tip end 19 of the valve seat 18. The tip end 19 of the valve seat 18 is positioned adjacent to inner peripheral surface and upstream end of the intake passage 4a positioned downstream side of the reed valve 7'. The opening of the control passage 20 is positioned at the initial opening position of the reed valve 7'.

More specifically, the vertical control passage 20a which is connected to the inlet chamber 10 is extended to the lower part of the main intake pipe 4 in such a manner as to be displaced to one side thereof. The horizontal control passage 20b which is connected to the lower end of the vertical control passage 20a is positioned below the main intake passage 4b positioned at the upstream side of the reed valve 7', and extends obliquely away from the vertical control passage 20a so as to be opened at 20c to the end 19 of the valve seat 16 and the end bottom of the main intake passage 4b positioned at the upstream side of the reed valve 7'. In addition, since the horizontal control passage 20b extends in the oblique direction with respect to the center line of the main intake pipe 4 in this embodiment, the air-fuel mixture in the inlet chamber 10 is jetted from the opening 20c of the control passage into the main intake pipe 4 and produces a vortex flow, thereby improving the agitation and atomization of the air-fuel mixture.

Hence, the capacity of the inlet chamber 10, the length of the control passage 20, the cross-sectional area thereof and the like may be properly determined in a corresponding manner with the cross-sectional area and capacity of the main intake passage, the displacement of the engine, the rigidity of the reed 7b', the rotation speed range of the engine or the like.

Figure 9:
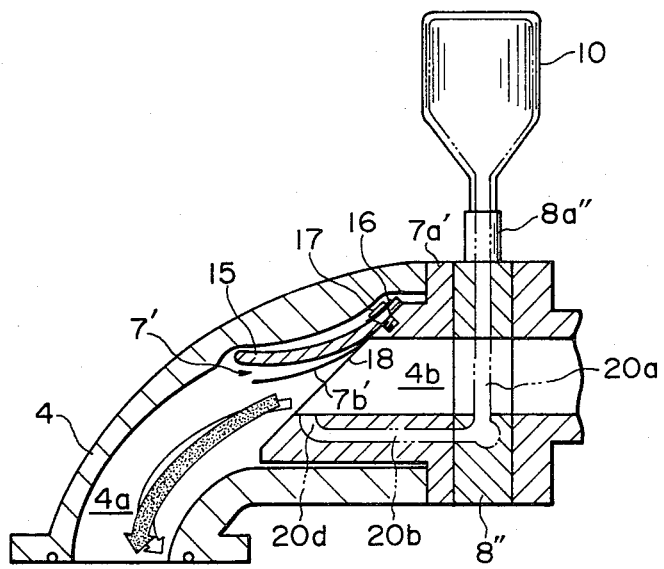
FIG. 9 is a cross-sectional view showing an intake system according to a third embodiment of this invention.
Figure 10:
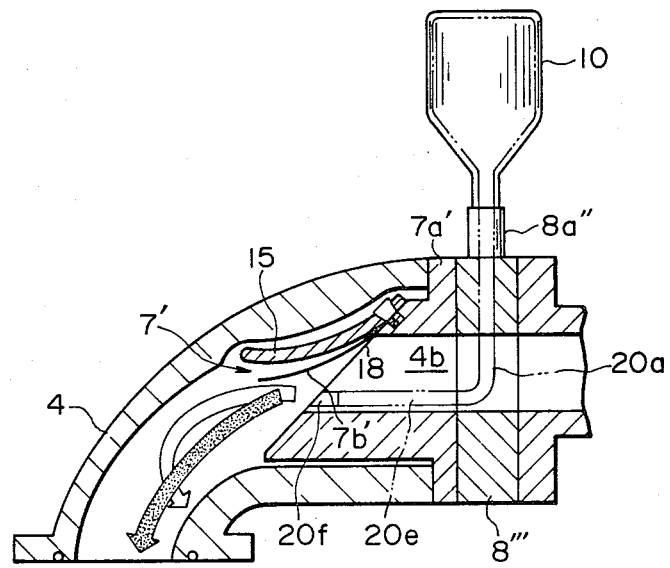
FIG. 10 is a cross-sectional view showing an intake system according to a fourth embodiment of this invention.

Now, the third and fourth embodiments of the intake system in accordance with the present invention will be explained with reference to FIG. 9 and FIG. 10.

In the second embodiment, the end portion 20c of the horizontal control passage 20b is opened to the valve seat end 19 and the bottom of the end of the main intake passage 4b at the upstream side of the reed valve 7'. According to the third embodiment, the end 20d of the horizontal control passage 20b may be opened only to the bottom at the downstream end of the main intake passage 4b at the upstream side of the reed valve 7'.

In the fourth embodiment, the horizontal control passage 20e which is connected to the lower end of the vertical control passage 20a may be positioned adjacent either one or both of the side surfaces of the main intake passage 4b at the upstream side so as to be opened at 20f to the side surface at the end of the main intake passage 20a at the upstream side.

Although the reed valve of a monoplane type is employed in the second through fourth embodiments, the reed valve of a biplane type as shown in the first embodiment may also be employed. Any valve which is applicable in the present invention may be used instead of the reed valve, provided that it is the one-way valve.

Inasmuch as the control passage which is in communication with the main intake pipe is provided in the vicinity of the initial opening portion of the one-way valve as mentioned above in the second through fourth embodiments, and the control passage is connected to the supplemental chamber of a required capacity, the supplementary chamber is temporarily filled with the air-fuel mixture because of the intake inertia just after the one-way valve is closed. When the one-way valve starts to be opened because of the intake negative pressure in the next intake stroke, not only the air-fuel mixture from the carburetor but also the air-fuel mixture which is temporarily filled in the supplemental chamber as mentioned above are fed into the combustion chamber of the engine by way of the main intake pipe, thereby enhancing the charging efficiency of of the engine, increasing the output and lowering the fuel cost.

Further, according to the second to fourth embodiments, since the opening of downstream end of the control passage is positioned at initially opening position of the reed valve, the air-fuel mixture is sufficiently introduced into the combustion chamber even during low rotation range of the engine whereat relatively low negative pressure is created within the intake pipe during the intake stroke of the engine. That is, because of this positional relationship between the opening of the control passage and the reed, the free end of the reed is easily deformable against its resiliency by the flow of the air-fuel mixture flown from the supplemental chamber. As a result, the combustion chamber is subject to substantially uniform air-fuel mixture introduction during its intake stroke regardless of the rotation range of the engine, and the air-fuel mixture is promptly introduced into the combustion chamber in response to the intake stroke of the engine.

Although the present invention has been described in detail hereinabove with respect to the embodiments which are shown on the accompanying drawings, the present invention is not limited to those embodiments but varied or modified at will without departing from the spirit of the invention, if necessary.

What is claimed is:

1. An intake system for use in an internal combustion engine which includes a combustion chamber defined by a piston and a cylinder, a cylinder head formed therein, an intake passage means, a carburetor and a throttle valve adapted to supply air-fuel mixture therethrough, comprising:
    (a) a check valve positioned at a downstream side of said throttle valve, said check valve being adapted to permit inflow of said air-fuel mixture but prevent backflow thereof during a compression stroke of said engine; and
    (b) a supplemental chamber connected to an intake passage at a position between said throttle valve and said check valve, an interior of said supplemental chamber being in fluid communication with said intake passage.

2. An intake system as defined in claim 1 wherein said supplemental chamber is connected to said intake passage via a through-hole formed therein, and a lower end of said through-hole is opened tangentially with respect to an inner cylindrical periphery of said intake passage.

3. An intake system as defined in claim 1 wherein said check valve is a reed valve, said reed valve having a reed whose upper end is fixedly secured to a valve seat of a valve body of said reed valve, so that a free end of said reed is positioned at bottom portion of a valve seat of said reed valve.

4. An intake system as defined in claim 3 wherein said intake passage means comprises a control passage, an upstream end of said control passage being opened to said supplemental chamber and a downstream end of said control passage being opened to said intake passage at a position adjacent to a downstream end of a lower portion of said valve body.

5. An intake system as defined in claim 4 wherein said downstream end of said control passage is opened so as to confront with a free end surface of said reed.

6. An intake system as defined in claim 3 wherein said intake passage means comprises a control passage, an upstream end of said control passage being opened to said supplemental chamber and a downstream end of said control passage being opened to said intake passage at a position adjacent to an inner periphery of downstream lower end of said valve body.

7. An intake system as defined in claim 6 wherein said downstream end is oriented substantially perpendicular to an axial direction of said valve body and is opened at an inner periphery of downstream lower end of said valve body.

* * * * *